Oct. 19, 1948.  J. F. O'BRIEN ET AL  2,451,507
ELECTRICAL OUTLET RECEPTACLE DEVICE
Filed March 9, 1946
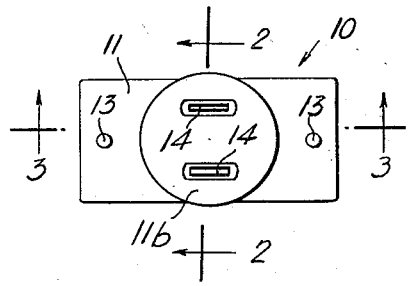
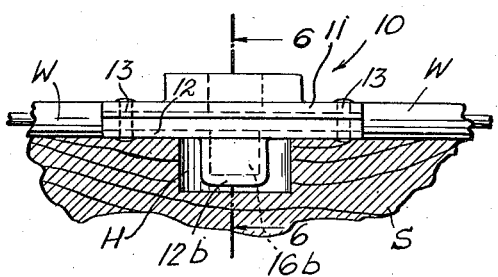
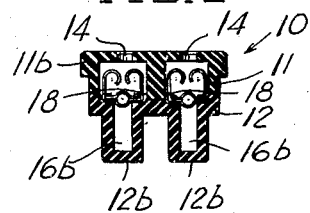
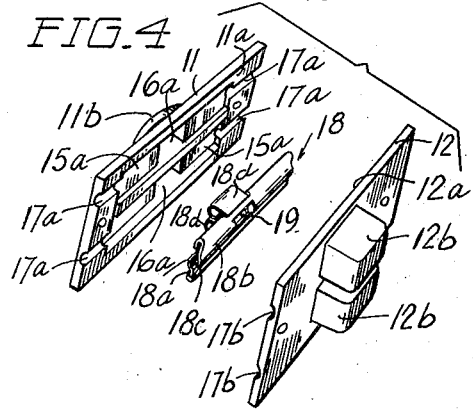
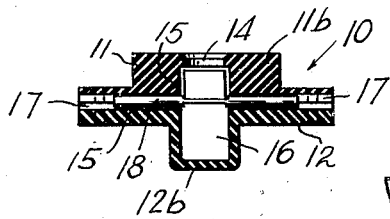
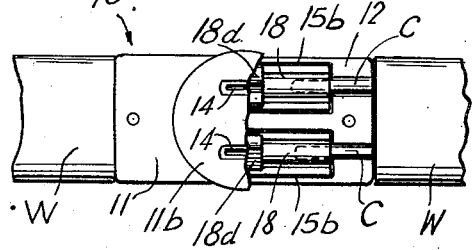
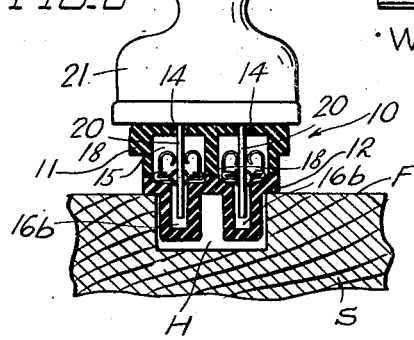
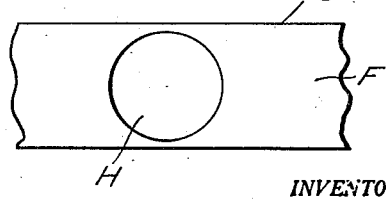
INVENTORS
JOSEPH F. O'BRIEN
EARL S. BOYNTON
BY
Henry J. Luck
ATTORNEY Patented Oct. 19, 1948

2,451,507

UNITED STATES PATENT OFFICE 2,451,507

ELECTRICAL OUTLET RECEPTACLE DEVICE

Joseph F. O'Brien, Lebanon, and Earl S. Boynton, East Orange, N. J., assignors to John B. Pierce Foundation, New York, N. Y., a corporation of New York Application March 9, 1946, Serial No. 653,322

6 Claims. (Cl. 173—330)

The invention relates to electrical outlet receptacle devices.

More particularly, the invention is directed to electrical outlet receptacles for wiring systems, and in further particular to electrical outlet receptacles adapted for use in surface type wiring systems wherein the wiring strip embodying electrical conductors is secured along the surface of walls or other supporting structure.

An object of the invention is to provide, in surface wiring systems, an electric outlet receptacle whose exposed thickness and width in major part is substantially equal to the thickness and width of the wiring strip with which it is interconnected.

An object of the invention is to accomplish the above objective while providing for close and positive electrical and mechanical engagement of electrical contacts of utility appliance plugs with the outlet terminals of the receptacle device, as well as positive electrical and mechanical interconnection of the outlet receptacle device with the wiring strip of the system.

A feature of the invention resides in the placing of the outlet contact terminals intermediate the overall depth or thickness of the receptacle, and arranging them in such manner that the electrical contacts of utility appliance plugs pass completely therethrough in their interengaging relationship.

A feature is the provision of pockets protruding from a relatively broad installation face of the receptacle device for the reception and accommodation of those portions of the electrical contacts of utility appliance plugs which pass beyond the outlet contact terminals of the receptacle. Thus, the said installation face of the receptacle device is arranged to rest flush against the surface of the structure supporting the wiring system, while the pockets are arranged to protrude into a relatively small receiving recess provided in such supporting structure. Accordingly, only a portion of the total depth or thickness of the outlet receptacle device projects from the supporting surface.

Further objects and features of the invention will appear in the following detailed description and the accompanying drawings illustrating preferred embodiments of the invention.

Figure 1 is a front or top plan view of a preferred embodiment of an outlet receptacle device pursuant to the invention;

Fig. 2 is a sectional view taken on line 2—2 of Fig. 1;

Fig. 3 is a sectional view taken on line 3—3 of Fig. 1;

Fig. 4 is an exploded view in perspective of the device shown in the foregoing figures;

Fig. 5 is a side elevation of the above illustrated device shown interconnected with an electrical wiring strip, forming a surface wiring installation, the supporting structure being shown in section;

Fig. 6 is a sectional view taken on line 6—6 of Fig. 5, and showing a utility appliance plug in engaging relationship with the outlet contact terminals of the receptacle device;

Fig. 7 is a fragmentary front or top plan view of the supporting structure showing a form of recess into which the protruding pocket portion of the receptacle device fits upon installation;

Fig. 8 is a front or top plan view corresponding to Fig. 5, but showing a portion of the receptacle device broken away to reveal internal structure, the supporting structure being omitted.

Referring to the drawings, the numeral 10 designates generally the outlet receptacle device, the preferred form illustrated being especially advantageous for use with flat types of wiring strip, such as that indicated W in Figs. 2 and 8, shown installed upon the exposed finish surface of a suitable supporting structure indicated at S. In the illustrated assembly, the receptacle device as shown matches the wiring strip in respect to ornamentation, namely, having an exposed thickness and width which, in major part, is substantially equal to that of the wiring strip.

As illustrated, the outlet receptacle device 10 comprises a two part housing comprising the elongated plates 11 and 12 which are secured together in face-to-face registering relationship by any suitable means, such as the rivets 13, 13, see Figs. 1 and 5.

The plates may be formed of insulating material, for example, of a phenol plastic composition, such as that sold presently under the trade-mark "Bakelite," and are shown having thin meeting faces 11a and 12a correspondingly recessed to combinedly provide certain necessary chambers internally of the housing. The plates are shown both formed with portions which protrude from those broad faces thereof lying opposite the said recessed meeting faces, these protruding portions being correspondingly disposed intermediate the ends of the plates.

In the instance of the plate 11 the protruding portion is a circular outlet portal 11b equipped with side-by-side plug-in openings or apertures 14, 14. In the instance of the plate 12 the protruding portion comprises a pair of pocket members 12b, 12b, which define a corresponding pair of pockets internally of the housing as part of the internal chambering thereof.

Cooperating with the aforementioned recessing of the meeting faces 11a and 12a of the housing plates 11 and 12, longitudinal recesses 15a, 15a, and intermediate recesses 16a, 16a, are formed in the plate 11, see Fig. 4, and corresponding longitudinal recesses 15b, 15b, and intermediate recesses 16b, 16b, are formed in the plate 12, see Figs. 8 and 2. The intermediate recesses 16b, 16b, serve as a pair of pockets, above referred to. Narrow longitudinal recesses 17a, 17a and 17a, 17a are disposed at opposite ends, respectively, of plate 11, and corresponding narrow longitudinal recesses 17b, 17b and 17b, 17b are disposed at opposite ends, respectively, of plate 12.

Upon placing the two housing plates 11 and 12 in face-to-face registering relationship in the assembly of the receptacle device 10, the aforementioned recesses combine to form side-by-side longitudinal chambers 15, 15, having narrow entry passages 17, 17 and 17, 17, respectively, at opposite ends of the device, and chambers 16, 16 extending transversely across the longitudinal chambers 15, 15, respectively, intermediate the length of the device, see Fig. 3.

The longitudinal chambers 15, 15 serve to receive and retain electrical contact elements 18, 18, and the entrance passages 17, 17 and 17, 17 afford mating of bared terminal ends C, C of the electrical conductors of wiring strips W with said electrical contact elements 18, 18, respectively, see Fig. 8.

The illustrated electrical contact elements 18, 18, Fig. 4, are of the general type set forth in the copending application of Joseph F. O'Brien, Serial Number 504,698 filed October 2, 1943, and entitled Connector means for electrical conductors.

These electrical elements 18 each include preferably an upper plate 18a of spring brush copper, see Fig. 4, clasped by a lower plate 18b of Phosphor bronze, the two plates being longitudinally grooved along their meeting faces to combinedly provide an open-ended tubular sleeve 18c for receiving in tight electrical engagement at opposite ends thereof electrical conductor termini of interconnecting wiring strips, as afore-explained. Intermediate the ends of the element an upstanding pair of relatively short spring clip members 18d, 18d, see also Fig. 8, here shown integral with the upper plate 18a, provide a resilient outlet terminal, and between these clip members the plates 18a and 18b are apertured, as at 19, Fig. 4, to enable an interengaging electrical contact member of an interconnecting electrical device to pass completely through the contact element 18, as hereinafter described.

The above particular type of contact element is preferred in the instant inventive combination, but it is apparent that other types may be employed provided they embody characteristics conforming to the purposes and objects of the invention.

As assembled with the housing plates 11 and 12 in the outlet receptacle 10, the pairs of spring clip members 18d, 18d and 18d, 18d are accommodated within the recesses 16a, 16a and are aligned with apertures 14, 14 for receiving the contacts of electric devices utilizing the receptacle device. Thus, as illustrated in Fig. 6, the blades 20, 20 of electric utility plug 21 pass through the outlet openings or apertures 14, 14 of the receptacle device engage with the respective pairs of spring clip members 18d, 18d and 18d, 18d and continue on through the apertures 19, 19 into the accommodating pockets 16b, 16b.

The receptacle housing, made up of plates 11 and 12, is also provided with an elongated portion of substantially flat strip formation and an enlarged intermediate outlet portion. As illustrated in Figs. 5 and 6, the device is adapted for installation upon supporting structure, such as indicated at S, with that broad face 10a thereof from which the pocket members 12b, 12b protrude, lying flush against the exposed finish surface F of the supporting structure.

For accommodating the protruding pocket members 12b, 12b, an appropriately dimensioned recess is provided in the supporting structure. As shown in Figs. 5, 6 and 7, this is conveniently accomplished by boring a round hole H in the structure from the finish surface thereof prior to installation of the receptacle device, the diameter thereof being less than the width of the major portion of the receptacle housing.

Whereas the invention has been illustrated and described with respect to a preferred specific embodiment thereof, it should be understood that various changes may be made in said specific embodiment and various other embodiments may be constructed by those skilled in the art without departing from the spirit and generic purview of the invention as set forth herein and defined by the following claims.

We claim:

1. An electric outlet receptacle device comprising a housing having an elongated portion of substantially flat strip formation adapted to lie with a broad face flush against a supporting surface, and having an enlarged intermediate outlet portion; longitudinal chamber means defined within said elongated portion of the housing for receiving and retaining electrical contact elements, said chamber means being open-ended providing passage for electrical conductors; chamber means defined within said enlarged outlet portion of the housing, said enlarged outlet portion protruding from said broad face, and the last-named chamber means extending transversely across said longitudinal chamber means into the said protruding portion of the housing providing pocket means for accommodating the contact means of electrical devices utilizing said outlet receptacle device; electrical contact elements lying within said longitudinal chamber means and having intermediate outlet members disposed at the junction of the said internal chamber means; and aperture means formed through said enlarged portion of the housing opposite said pocket means, affording entry of said contact means of electrical devices utilizing the outlet receptacle device.

2. An electric outlet receptacle device as recited in claim 1 wherein the intermediate outlet members of the electrical contact elements are pairs of resilient clips, and wherein such contact elements are apertured between the individual clips of each pair for the passage therethrough of the contact means of electrical devices utilizing the outlet receptacle device.

3. An electric outlet receptacle device comprising two plates of insulating material adapted to fit together in registering face-to-face relationship to form a housing having an elongated portion of substantially flat strip formation adapted to lie with a broad face flush against a supporting surface, and having an enlarged intermediate outlet portion protruding from said broad face, said plates having their meeting faces recessed correspondingly to combinedly provide longitudinal open-ended chambers for receiving and retaining electrical contact elements affording electrical interconnection with electrical conductors of wiring strips, and to provide, at said enlarged outlet portion, chambers which run transversely across said longitudinal chambers and form pockets within said protruding portion of the housing for accommodating the contacts of electrical devices utilizing said outlet receptacle device; electrical contact elements lying within said longitudinal chambers and having intermediate outlet members disposed at the junction of the said internal chambers; and aperture means formed through said enlarged portion of the housing opposite said pockets, affording entry of said contacts of electrical devices utilizing the outlet receptacle device.

4. An electric outlet receptacle device as recited in claim 3 wherein the intermediate outlet members of the electrical contact elements are pairs of resilient clips, and wherein such contact elements are apertured between the individual clips of each pair for the passage therethrough of the contacts of electrical devices utilizing the outlet receptacle device.

5. An electrical outlet receptacle device comprising an elongated member of insulating material and provided at its forward face intermediate its ends with a pair of outlet apertures, and having at its rearward face a plurality of pairs of mutually aligned grooves associated with said outlet apertures respectively, each groove extending from an end of said member and terminating at a location short of alignment with its associated said outlet aperture; a second elongated member of insulating material corresponding in length and width with said first named member and having at its forward face pairs of mutually aligned grooves and located on said forward face of said second member to respectively complement said plurality of pairs of grooves on the rearward face of said first named member when said members are brought in face-to-face relation, said second named member being further provided at its rearward face with pocket formations disposed in substantial alignment with said sets of outlet apertures when said members are brought in face-to-face relation, each of said plurality of grooves on the forward face of said second named member extending from an end of said member and terminating short of its associated said pocket formation; said first named member at its rearward face and said second named member at its forward face, being respectively provided with a pair of complementary pocket formations; a plurality of electrical contact elements disposed in said complementary pocket formations of said first named member and said second named member, said electrical contact elements each including an outlet terminal positioned in alignment with one of said outlet apertures and disposed in one of said pocket formations, each electrical contact element further having laterally extending portions inclusive of a tubular sleeve portion, the axes of said tubular sleeve portions of said electrical contact elements being respectively disposed in substantial alignment with its associated pair of complementary grooves of said first named member and said second named member.

6. An electrical outlet receptacle device as defined by claim 5 in which said electrical contact elements are of flat formation extending substantially parallel to the forward face of said first named member.

JOSEPH F. O'BRIEN.
EARL S. BOYNTON.

REFERENCES CITED

The following references are of record in the file of this patent:

UNITED STATES PATENTS

| Number    | Name    | Date           |
|-----------|---------|----------------|
| 1,966,379 | Dodge   | July 10, 1934  |
| 2,175,148 | Davison | Oct. 3, 1939   |
| 2,239,653 | O'Brien | Apr. 22, 1941  |
| 2,351,632 | O'Brien | June 20, 1944  |
| 2,373,331 | O'Brien | Apr. 10, 1945  |